(12) United States Patent
Colman

(10) Patent No.: US 6,971,263 B1
(45) Date of Patent: Dec. 6, 2005

(54) GOLF BALL PRECISION BALANCING SYSTEM

(76) Inventor: Peter Ingalls Colman, P.O. Box 434, Long Boat Key, FL (US) 34228

( * ) Notice: Subject to any disclaimer, the term of this patent is extended or adjusted under 35 U.S.C. 154(b) by 213 days.

(21) Appl. No.: 10/425,313

(22) Filed: Apr. 29, 2003

Related U.S. Application Data

(60) Provisional application No. 60/376,376, filed on Apr. 29, 2002.

(51) Int. Cl.[7] ............................................. G01M 1/00
(52) U.S. Cl. ...................................................... 73/65.02
(58) Field of Search ............................ 73/65.01, 65.02, 73/65.03

(56) References Cited

U.S. PATENT DOCUMENTS

| | | | | |
|---|---|---|---|---|
| 4,111,038 A | * | 9/1978 | Olson et al. ................ | 73/65.02 |
| 4,928,516 A | * | 5/1990 | Movick ...................... | 73/65.02 |

OTHER PUBLICATIONS www.wilsontrue.com—Test it Yourself-p. 1, no date.

* cited by examiner

*Primary Examiner*—Robert Raevis
(74) *Attorney, Agent, or Firm*—Dorothy S. Morse

(57) ABSTRACT

A compact, portable, and expedient system for precisely testing the balance of balls used in sports and competitive games, which includes a test container slightly larger than the ball being tested. Preferably, the test container has several spaced-apart ball-centering guides, a fluid fill line, a removable cap, a sleeve attached to the cap and adapted for positioning a permanent ink marker relative to the golf ball being tested for consistent ball marking, and at least one associated packet of pre-measured ingredients for raising the specific gravity of the fluid used in the test container for balance testing. Optionally, a ball lifter can be used for removing a ball from the test container subsequent to balance testing. It is contemplated that an operator will be able to test multiple balls with a single packet of pre-mixed and pre-measured specific gravity increasing chemicals.

20 Claims, 1 Drawing Sheet

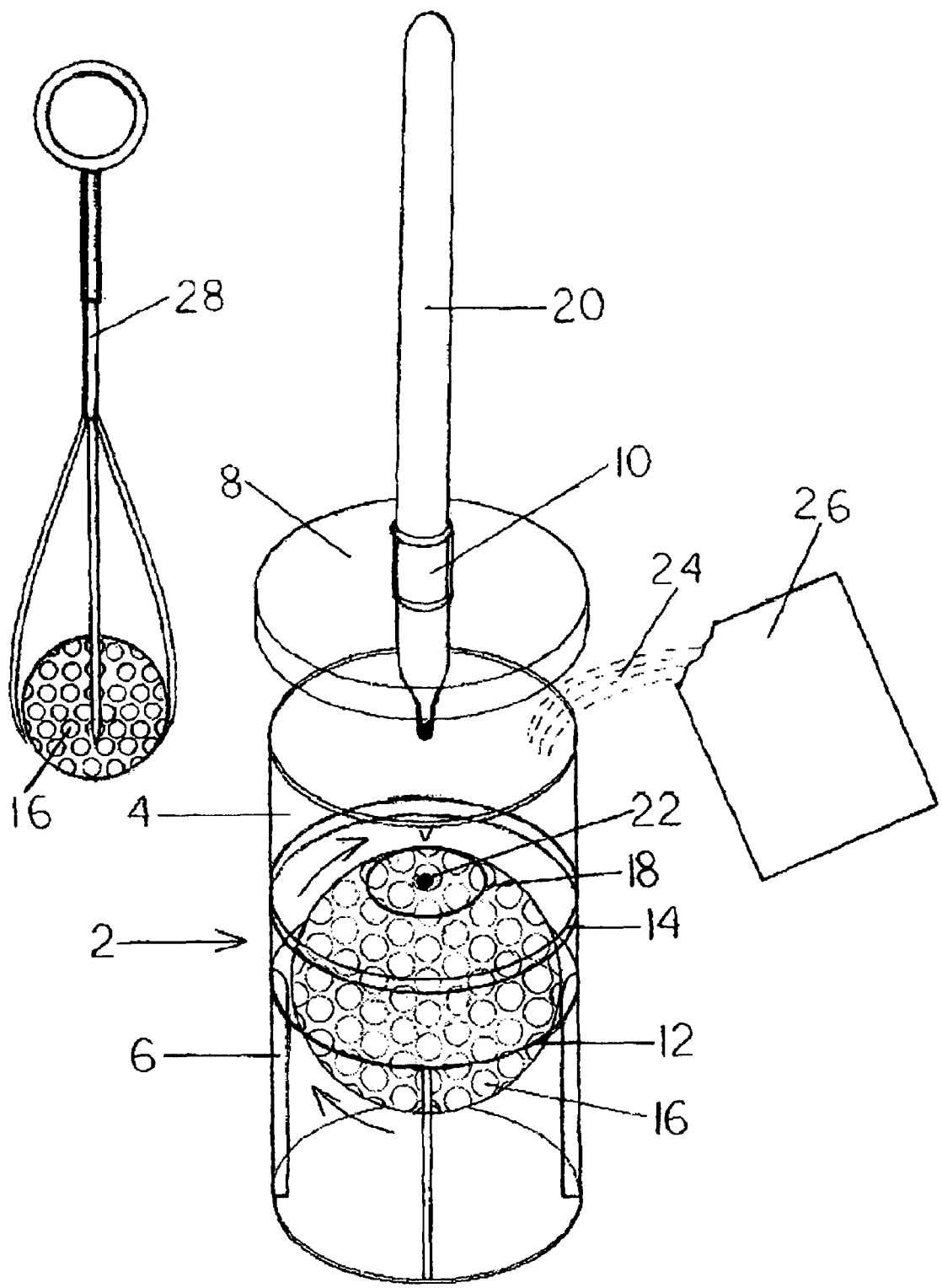

GOLF BALL PRECISION BALANCING SYSTEM

CROSS-REFERENCES TO RELATED APPLICATIONS

The subject matter of the present invention was previously disclosed in U.S. Provisional Patent Application 60/376,376 to the same inventor, filed on Apr. 29, 2002 and also entitled "Golf Ball Precision Balancing System".

BACKGROUND OF THE INVENTION

1. Field of the Invention

This invention relates to apparatus and methods used for precisely testing the balance of balls used in competitive games and sports, specifically to a system for precisely testing the balance of substantially round balls used in sports such as golf, and other competitive games such as but not limited to billiards and croquet, that has a test container with an inner wall dimension slightly larger than the diameter of the ball being tested, the test container also having a height dimension sufficient for floating and freely spinning the ball being tested. Preferably, several vertically extending guides are located at spaced-apart positions within the test container to help center the ball undergoing balance testing during its rotation and assist in its easy retrieval from the test solution once balance testing is done. The test container would also preferably have a marked fluid fill line for expediency in obtaining the exact amount of fluid desired for mixing with pre-measured amounts of specific gravity increasing chemicals to promptly produce the needed volume and concentration of test solution. The balancing system of the present invention also includes a removable cap, a sleeve attached to the cap for centering a permanent ink marker relative to the ball being tested for consistent ball marking, and multiple packets of pre-measured and pre-mixed chemicals that are each capable of raising the specific gravity of the pre-measured fluid in the test container a sufficient amount to float the ball being tested and allow only a very small portion of it to remain above the fluid surface during balance testing. Optionally, a ball lifter can be used for neat and efficient removal of a ball from the test container when testing is complete, and prompt splash-free introduction of additional balls for subsequent balance testing in the same test solution. The ball lifter serves several functions, such as preventing the marked portion of the ball from becoming submerged prior to drying of the ink mark placed upon the ball with the permanent marker, minimizing the amount of test solution lost during ball exchange, and allowing for faster ball exchange. Thus, it is contemplated for the present invention to allow operators to test multiple balls with each packet of pre-mixed and pre-measured specific gravity increasing chemicals used.

2. Description of the Related Art

Many sports and competitive games involve the use of a bat, club, or stick to strike a ball, so as to move it through a specified distance in a desired direction. The challenge for the player is to achieve the muscular control and experience to know how much force to apply to the ball to move it most expediently to a target area or goal. Players must learn to strike the ball squarely from behind to move it in a straight forwardly direction, and to strike it in various off-center positions to move the ball up or down during flight, or to make it curve to the right or left, such as might be needed to avoid hazards on a playing field and/or make accommodations for terrain. The condition of the ball is also a factor affecting the outcome of play. Gouges, scratches, cuts, and other markings on a ball's surface will affect its aerodynamics, should it become airborne during play. Further, if the center of gravity of a ball used in sports and other competitive games is not exactly at the physical center of the ball, and a player is unaware of this condition, the directional movement and distance results obtained when such a ball is hit may be much different than anticipated, and an unpleasant surprise to the player. However, if a player is able to determine in advance of play whether a ball to be used in a sport or competitive game is out-of-balance, and if the player is to be able to mark its lightest side, the player may be able to use the out-of-balance information about the ball to his or her advantage.

A method for testing the balance characteristics of golf balls is known. It involves the use of a clear container, water, and enough Epsom salts being placed into the water to make a golf ball float partially above the surface of the water. Once floating, the golf ball is spun. When it stops spinning, the part of the ball sticking up out of the water is marked. The ball is then spun again. If it is out-of-balance, the mark made on the ball will again be sticking up out of the water after the ball stops spinning, and reveal the ball's lightest side. Additional spinning will again result in the same marked area of the ball being raised above the surface of the water when the ball stops spinning. When an in-balance ball is spun, one having its center of gravity located at its geometric center, the portion of the ball sticking out of the water after rotation will typically be different each time it is spun. No lightest side will be revealed and amount of rotation occurring will depend largely upon the strength of the rotational force applied to the ball, in combination with the ever present friction occurring between the ball and the molecules of the test solution, instead of also being affected by the counter-rotational gravitational force that would influence a heavy side of the ball and eventually pull it downward. The present invention provides a means for accomplishing the testing of balls used for a variety of sports and/or competitive games in a faster, neater, more convenient, and operator friendly manner, so that players can better understand the relative flight rotational and friction related characteristics of the specific balls they intend to use during the sport or game to predetermine the directional capabilities of each.

BRIEF SUMMARY OF THE INVENTION—OBJECTIVES AND ADVANTAGES

The primary object of this invention is to provide a precision balancing test system for sports balls and balls used for competitive games, including golf balls, that is compact and easy to use for an expedient determination as to whether the substantially round ball being tested is in-balance or not. It is also an object of this invention to provide a balancing test system that is operator friendly, safe to use, and made from lightweight materials for easy transport and manipulation by a single operator. A further object of this invention is to provide a balancing test system that after testing of a first ball can be used with little or no alteration for subsequent testing of additional balls. It is a further object of this invention to provide a balancing test system that allows for easy removal of a tested ball from the test container without significant splashing or spills, loss of testing solution, and/or the use of a large container into which the testing solution could be temporarily transferred after balance testing for hand retrieval of a tested ball. It is also an object of this invention to provide a balancing test system that can be conveniently used at an off-site location in advance of a game, as well as on-site. A further object of this invention is to provide a balancing test system that is configured for easy viewing of the ball being tested during its rotation.

As described herein, properly manufactured and used, the present invention provides a precision balancing test system for sports balls and other substantially round balls used for competitive games, including golf balls. Typically, balls would be tested in advance of play, such as the night before a round of golf. However, since the present invention is compact and made of lightweight materials, it could be transported to the area of play for on-site balance testing, if needed. The preferred test container of the present invention would have an inside diameter dimension that is approximately one-half of an inch larger than the diameter of the ball being tested, so that the ball freely floats and a minimum of approximately one-fourth of an inch could remain between the test container and all sides of the ball during its rotation. To facilitate adding the correct amount of fluid to the test container for mixing with one packet of pre-measured and pre-mixed specific gravity raising chemicals, a fluid fill line would be pre-marked on the outside surface of the test container. Since an operator would not have to alternatively add chemical and fluid to the test container until the proper balance of chemical and fluid is achieved to float the ball within the test container while only a small portion of the ball is raised above the test solution surface during balance testing, the process could be completed much faster than if the operator had to experimentally mix the proper amount of chemicals and fluid each time to create a test solution that would float a test ball only slightly above the surface of the test solution. Preferably, several vertically extending guides are located at spaced-apart positions within the test container to help center the ball undergoing balance testing during its rotation and assist in its easy retrieval from the test solution with a ball lifter. The removable cap of the present invention would preferably have a snap-fit connection to the open top end of the test container, although other connections, such as but not limited to a threaded connection, are also anticipated. The cap assists in mixing the test chemicals and its connected sleeve supports an ink marker used to denote the light side of an out-of-balance ball. Multiple markers can be used, each with a different color. Thereby, a ball only slightly out-of-balance could receive a blue mark and a ball more severely out-of-balance could obtain a distinguishing red mark. Not only would the sleeve connected to the cap center the ink marker relative to the ball being tested, it would position the marker at the correct height for rapid and consistent ball marking. Although it is contemplated for only one packet of pre-measured chemicals at a time to be needed when fluid in the test container is added to the pre-marked fill line to make test solution, and for the test solution so made to be usable for testing the balance of multiple balls in sequence, additional packets would be made available for when the test solution is prematurely discarded, and when a storage location or the anticipated duration of time until a next use would not permit safe preservation of the test container and solution. Also to conserve test solution for multiple uses, a retractable ball lifter can be used for splash-free entry of a ball into the test solution, as well as neat, rapid, spill-free, and efficient removal of a ball from the test container when testing is complete. The test container and ball lifter are compact in configuration and easy to use for expedient testing and easy transport and manipulation by an operator. Unless a portion of the test solution is inadvertently discarded, little or no modification is required between testing of subsequent balls. Although a transparent test container is preferred for easy viewing of the ball being tested during its rotation, it is not critical as the cap can be removed while the ball is being spun within the test container to allow an operator to view the spinning characteristics of a ball undergoing balance testing. The test container also preferably has a flat bottom surface so that it can remain upright without support during balance testing. No system or apparatus is known that has all of the advantages of the present invention.

The description herein provides the preferred embodiments of the present invention but should not be construed as limiting the scope of the balance testing system for sports balls and balls used in other competitive games. For example, variations in the length, height, and diameter dimensions of the test container; the size and type of ball used as long as the test container is sufficiently larger than the ball to allow it to float and freely rotate; the number and configuration of the ball centering guides used; the number of permanent ink markers used; the color of marking ink used; the number of chemical packets associated with each test container; the length of the sleeve connected to the cap; and the type of connection between the test container and its cap; other than those shown and described herein may be incorporated into the present invention. Thus the scope of the present invention should be determined by the appended claims and their legal equivalents, rather than being limited to the examples given.

BRIEF DESCRIPTION OF THE SEVERAL VIEWS OF THE DRAWINGS

The sole illustration provided is a front exploded view of a first preferred embodiment of the present invention having a test container with a pre-marked fill line holding a floating golf ball, several ball centering guides within the lower portion of the test container, a cap with a sleeve supporting a permanent-ink marking pen, specific gravity increasing chemicals from a packet being added to the test container, and a retractable ball-lifting device supporting a second golf ball for subsequent balance testing after the first golf ball is removed from the test container.

DETAILED DESCRIPTION OF THE INVENTION

The sole illustration provided shows the most preferred embodiment 2 of the present invention balance testing system for sports balls and balls used for other competitive games, such as but not limited to golf, billiards, and croquet. The illustration shows a golf ball 16 floating within a test container 4 between several spaced-apart and vertically extending ball-centering guides 6. Preferred test container 4 has a flat bottom surface so that it can be used without additional support means on a substantially flat surface, and an open top end through which golf balls 16 can be inserted and removed from test container 4. The illustration also shows an easily opened packet 26 of pre-measured and pre-mixed chemicals 24 being added to the fluid within test container 4 to raise the fluid's specific gravity a sufficient amount to allow it to support golf ball 16 in a freely floating position with only a small portion of the top of golf ball 16 exposed through the upper surface 14 of the test solution made from a fluid, such as water, and the pre-packaged chemicals 24, such as but not limited to Epsom salts and other salt mixtures. Although distilled, deionized, and/or potable water are the fluids of choice for balance testing in the present invention, it is also contemplated for most any source of water or other non-flammable fluid to be used for balance testing purposes, unless it would contain too many friction-enhancing suspended solids to allow free rotation of golf ball 16, have a tendency to leave a residue on golf ball 16, or have too dark a color to allow a clear viewing of golf ball 16 during rotation. In addition to the pre-packaged chemicals 24 containing one or more salts, it is also contemplated for one or more wetting agents to be optionally included as part of the pre-mixed and pre-packaged chemicals 24. Preferably also, although not limited thereto, test container 4 would be dimensioned so that golf ball 16, or any other ball that requires balance testing, remains a minimum of one-fourth of an inch away from the inside surfaces of test container 4 during balance testing rotation. The illustration also shows preferred embodiment 2 having a cover 8 with a sleeve 10 upwardly depending threrefrom in a substantially vertical orientation. A permanent ink marker 20 is inserted within sleeve 10, which supports marker 20 centrally over golf ball 16 when cap 8 is connected to test container 4. A snap-fit type of connection is contemplated between cap 8 and test container 4, however, other types of easily and rapidly manipulated connection, such as but not limited to a threaded connection, are also contemplated. In addition, sleeve 10 also supports permanent ink marker 20 in an exacting position relative to upper surface 14 of the test solution made from a fluid, such as water, and pre-packaged chemicals 24, so that a mark 22 can be precisely and promptly made in the center of the small area of golf ball 16 exposed through the upper surface 14 of the test solution within test container 4. The illustration further shows a ball lifter 28 supporting a second golf ball 16. It is contemplated for the prongs of ball lifter 28 to be retractable so that ball lifter 28 securely supports golf ball 16 during transport, while at the same time allowing for easy splash-free insertion of golf ball 16 within the test solution in test container 4 for balance testing, and prompt spill-free removal of golf ball 16 from test container 4 after balance testing is complete. The spaces between the vertically extending guides 6 within test container 4 also provide the amount of clearance necessary for the expansion required by the retractable ball-holding prongs of ball lifter 28 to release golf ball 16 into the test solution within test container 4.

To use the present invention, and operator (not shown) would first place test container 4 on a substantially level surface (not shown). Fluid would be added to the interior of the test container 4 until it reached fluid fill line 12. Although not limited thereto, it is contemplated for the upper ends of the vertically extending ball-centering guides 6 in preferred embodiment 2 to be positioned in the approximate vicinity of fluid fill line 12. Package 26 would then be opened to allow pre-mixed chemicals 24 to be added to the fluid in test container 4. Mixing of chemicals 24 and the fluid in test container 4 could take place by snap-fitting cap 8 over the open top end of test container 4, using a thumb or finger to close the central bore in sleeve 10, and then shaking test container 4 end for end until mixing is thorough and complete. Cap 8 would then be removed from test container 4 and the positioning of golf ball 16 within test container 4 scrutinized. If only a small portion of the upper surface of golf ball 16 is exposed through the upper surface 14 of the fluid in test container 4, then the operator is ready to proceed with the rotation of golf ball 16. Conversely, if golf ball 16 is not correctly positioned relative to fluid surface 14, then more chemicals 24 would be needed to raise golf ball 16, or more fluid would need to be added to test container 4 to lower golf ball 16. Although packet 26 is drawn to depict a container typically used for powdered contents, the configuration is not critical and could be square, round, oval, cylindrical, tubular, spherical, and the like. Further, chemicals 24 may be in powdered, crystalline, liquid, or any other easily dispersed and/or dissolvable form. Once golf ball 16 is in a correct position relative to upper surface 14, the operator would place a substantially top-to-bottom spin on golf ball 16. Although not limited thereto, a finger of the operator would be the tool most likely used to rotate golf ball 16. Spinning can be slow and steady, however it is preferred for more than one complete revolution of golf ball 16 to occur. Either during the spinning of golf ball 16, or once spinning is complete, the operator would attach cap 8 to test container 4. If test container 4 and cap 8 are not transparent, then attachment of cap 8 to test container 4 would occur after spinning is complete, so that the operator can observe the spinning characteristics of golf ball 16. Also, if cap 8 is attached to test container 4 during spinning, then marker 20 should be added to sleeve 10 only after golf ball 16 has stopped spinning. Further, if marker 20 is in its usable position within sleeve 10 when cap 8 is connected to test container 4, then immediately upon connection therebetween a mark 22 will be inscribed upon the outer surface of golf ball 6, in a centered location upon the small portion of golf ball 16 remaining exposed above the upper surface 14 of test solution made from a fluid and prepackaged chemicals 24. If cap 8 is attached to test container 4 without marker 20, then once golf ball 16 has stopped its balance testing rotation, marker 20 can be inserted within sleeve 10, which would be configured to allow marker 20 to only extend below cap 8 a sufficient distance to place a mark 22 upon golf ball 16 via casual contact and without causing the small portion of golf ball 16 raised above upper surface 14 to become submerged under it. After mark 22 is made and allowed to momentarily dry, golf ball 16 is again caused to undergo rotation. If after the second rotation mark 22 is again found in the center of the small portion of golf ball 16 raised above upper surface 14, then golf ball 16 has been determined to be out-of-balance, and its lightest side precisely identified by mark 22. The spin characteristics, as to whether the ball slowly or quickly reaches its equilibrium point after rotation has stopped, also reveals information about golf ball 16 to the operator. A golf ball 16 quickly reaching its equilibrium point will be significantly more out-of-balance than a golf ball 16 that takes a much longer time to reach equilibrium after rotation. Different colored markers 20 can be used to identify golf balls 16 and other balls that are in-balance or slightly out-of-balance, so that they can be promptly distinguished by sight from those that are more moderately or significantly out-of-balance. The knowledge of which side of golf ball 16 is lighter can assist a player in correcting a hook, avoiding a hazard, or tackling uphill terrain. To extract golf ball 16 from test container 4 after balancing rotation, although not limited thereto, for expediency, neatness, and preservation of test solution, it is preferred that retractable ball lifter 28 is used. The prongs of ball lifter 28 are initially extended slightly beyond a dimension equivalent to the diameter of golf ball 16 and inserted into test container 4 between ball centering guides 6. When the distal ends of the prongs of ball lifter 28 extend downward beyond the widest diameter of golf ball 16, the prongs of ball lifter 28 can be retracted around golf ball 16 and used to lift golf ball 16 from test container 4. Ball lifter 28 can then in a similar manner be used to insert and withdraw subsequent golf balls 16 from test container 4, in a splash-free and spill-free manner, before and after balance testing.

The preferred embodiment 2 of the present invention for testing the balance of golf balls 16 is compact, portable, and easy to use. Transparent materials are preferred for test container 4 and cap 8, to provide the easiest viewing of the rotation of a golf ball 16 during its balance testing, but are not essential as cap 8 can always be removed to view rotation of golf ball 16 within test container 4. Also, it is preferred for test container 4 and cap 8 to be made from shatter-resistant materials. Variations are contemplated in the length, height, and diameter dimensions of test container 4, cap 8, and ball lifter 28, to accommodate different types and sizes of balls, other than golf balls 16. The limiting size of test container 4 is dependant upon the size and type of ball used, so long as test container 4 always remains sufficiently larger than the ball intended for testing to allow it to float and rotate freely, but not too large to prevent precise placement of a mark 22 on the small portion of the ball raised above the test solution's upper surface 14. The number and length of the ball centering guides 6 used within test container are also not critical, although at least three ball centering guides 6 that extend between the bottom of test container 4 and fluid fill line 12 are preferred. The length and configuration of sleeve 10 are also not critical, as long as it suspends marker 20 in a substantially vertical position centered over test container 4, and also suspends marker 20 to a sufficient depth that its marking tip only that measures mass casually touches golf ball 16 to mark it without causing the small portion of golf ball 16 raised above upper surface 14 to become submerged. Although not shown, for additional convenience in assessing balance characteristics of golf ball 16, a measuring scale could be placed on the outside surface of container 4.

In the game of golf, particularly, the relative balance of the ball being used is critical to its overall performance. A player armed with the knowledge of a precision balanced golf ball can then better predict the flight characteristics of the ball on a tee in advance of club impact with the ball. The greater the imbalance in the ball, the greater the benefit provided to the golfer who knows about the imbalance and its extent. After the ball on a tee is impacted with a choice of club, any angle of impact to the ball off the club face forces a spin to the ball's trajectory. The trajectory then becomes gyroscopic relative to its own balance and initial placement on the tee. The spinning forces of the impacted golf ball build up relative kinetic energy from its core to its outer shell during flight. Further, as the spinning golf ball passes through the atmosphere, atmospheric friction occurs that affects the outer shell of the ball, while the core of the ball with its built-up kinetic energy under the spin commands its own directional influences due to gyroscopic effect. Therefore, the actual balance of a golf ball substantially influences its directional flight characteristics and capabilities, as a result of the combined gyroscopic effect, gravity, atmospheric friction, and kinetic energy. A player using a golf ball precision balanced by the present invention, armed with the knowledge of its relative balance or imbalance, could then use the knowledge as a tool to predetermine its flight and roll characteristics. A severely imbalanced golf ball that was precision balanced to reveal its lighter and heavier sides, would by its own nature during flight show a significant curvature to its trajectory, due to the gyroscopic effect, which could be even more greatly exaggerated by a less than direct club face impact with the golf ball. Further, a golf ball having only a slight imbalance during precision balance testing, would show substantially less curvature in its trajectory during flight. A player can then use the knowledge derived from precision balance testing with the present invention to potentially avoid hazards during flight

I claim:

1. A compact, portable, and expedient system for use with fluid and a marking device to precisely test the balance of substantially round balls used in sports and competitive games, said system comprising:
   a test container with an inside diameter dimension slightly larger than the diameter of the ball being tested, a height dimension sufficient for floating and freely spinning the ball being tested, a closed bottom end, and open top end, and a fluid fill line;
   a removable cap with a sleeve upwardly depending from said cap that is configured for removably securing a permanently marking device relative to the ball being tested in a position for reproducibly consistent ball marking; and
   at least one sealed packet of pre-measured ingredients that are selected for a combined ability to dissolve in fluid to create a test solution with a specific gravity able to float the ball being tested with only a very small portion of the ball remaining visible above the surface of said test solution during balance testing, so that when a quantity of fluid is placed into said test container between said closed bottom end and said fluid fill line, and said ingredients are transferred from said packet into said quantity of fluid and mixed therewith to produce said test solution, sports balls one at a time can be rotated in said test solution and those that are imbalanced can be precisely marked when a light side is revealed after rotation.

2. The system of claim 1 wherein said container has an interior surface and at least three vertically extending and spaced-apart ball centering guides on said interior surface that are configured and dimensioned to center a ball being tested during rotation and to assist in easy ball retrieval from said container once balance testing is complete.

3. The system of claim 2 wherein said container is made from transparent material.

4. The system of claim 3 wherein said cap is made from transparent material.

5. The system of claim 4 further comprising a ball lifter having a distal end configured and dimensioned for prompt splash-free insertion of a ball to be tested into said container, neat and efficient extraction of balls from said container when testing is complete, and introduction of additional balls one at a time into said container for subsequent balance testing in said test solution.

6. The system of claim 5 wherein said ball lifter is configured and dimensioned to prevent the portion of the tested ball marked with said marking device from becoming submerged in said test solution.

7. The system of claim 6 wherein said ball lifter is further configured and dimensioned to minimize the amount of said test solution lost during ball exchange.

8. The system of claim 1 wherein said container is made from transparent material.

9. The system of claim 1 wherein said cap is made from transparent material.

10. The system of claim 1 wherein said container and said cap are made from transparent material.

11. The system of claim 1 further comprising a ball lifter having a distal end configured and dimensioned for prompt splash-free insertion of a ball to be tested into said container, neat and efficient extraction of balls from said container when testing is complete, and introduction of additional balls one at a time into said container for subsequent balance testing in said test solution.

12. The system of claim 11 wherein said ball lifer is configured and dimensioned to prevent the portion of the tested ball marked with said marking device from becoming submerged in said test solution.

13. The system of claim 12 wherein said ball lifter is further configured and dimensioned to minimize the amount of said test solution lost during ball exchange.

14. The system of claim 1 wherein said test container has substantially vertical walls that define a substantially uniform diameter dimension between said bottom end and said top end.

15. A method for using the system of claim 1 for precisely testing the balance of balls used in competitive games and sports, said method comprising the steps of:
   providing at least one ball to be tested, a quantity of fluid, a ball-testing system according to claim 1, and a marking instrument configured for insertion into said sleeve;
   placing an amount of said fluid into said test container between said closed bottom end and said fill line;
   opening said sealed packet;
   pouring said pre-measured ingredients into said fluid;
   mixing said fluid and said pre-measured ingredients in said test container until said ingredients are dissolved in said fluid to form a test solution;
   placing a first said sports ball into said test solution;
   rotating said test ball;
   placing said cover over said open top end of said test container;
   inserting said marking instrument into said sleeve;
   waiting until rotation of said ball in said test solution has stopped;
   using said marking instrument to precisely mark the topmost point on said ball; and
   repeating said steps of rotating, placing said cover, inserting said marking instrument, and waiting to determine whether said previously marked topmost point is repeated so as to reveal a light side.

16. The method of claim 15 wherein said steps of placing, rotating, placing, inserting, waiting, marking, and repeating can be repeated for additional ones of said test balls in said same test solution.

17. The method of claim 15 wherein said container has an interior surface and at least three vertically extending and spaced-apart ball centering guides on said interior surface that are configured and dimensioned to center a ball being tested during rotation and to assist in easy ball retrieval from said container once balance testing is complete.

18. The method of claim 15 wherein said container is made from transparent material.

19. The method of claim 15 further comprising a ball lifter having a distal end configured and dimensioned for prompt splash-free insertion of each said test ball used into said container, neat and efficient extraction of said test balls from said container when testing is complete.

20. The method of claim 19 wherein said ball lifter is configured and dimensioned to prevent the portion of the tested ball marked with said marking device from becoming submerged in said test solution and to minimize the amount of said test solution lost during ball exchange.

* * * * *